United States Patent
Kim et al.

(10) Patent No.: US 11,739,831 B2
(45) Date of Patent: Aug. 29, 2023

(54) DIAL-TYPE SHIFTING CONTROL APPARATUS FOR VEHICLES

(71) Applicants: Hyundai Motor Company, Seoul (KR); Kia Corporation, Seoul (KR)

(72) Inventors: Bum Jun Kim, Siheung-si (KR); Jun Hyeong Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/344,385

(22) Filed: Jun. 10, 2021

(65) Prior Publication Data
US 2022/0065344 A1    Mar. 3, 2022

(30) Foreign Application Priority Data
Aug. 28, 2020   (KR) ........................ 10-2020-0108932

(51) Int. Cl.
*F16H 59/12*   (2006.01)
*F16H 59/08*   (2006.01)
*F16H 59/02*   (2006.01)

(52) U.S. Cl.
CPC ......... *F16H 59/12* (2013.01); *F16H 59/0208* (2013.01); *F16H 59/0278* (2013.01); *F16H 2059/081* (2013.01)

(58) Field of Classification Search
CPC .. F16H 59/12; F16H 59/0208; F16H 59/0278; F16H 2059/081; F16H 2059/0286; F16H 2059/0243; G05G 1/02; G05G 1/10; G05G 1/087; H01H 2217/02; H01H 3/08; H01H 25/065

USPC ....................... 74/473.12; 200/177
See application file for complete search history.

(56) References Cited

U.S. PATENT DOCUMENTS

| | | | |
|---|---|---|---|
| 2003/0029261 A1* | 2/2003 | DeJonge | F16H 63/42 74/335 |
| 2009/0260963 A1* | 10/2009 | Eto | H01H 25/065 200/293 |
| 2012/0137813 A1* | 6/2012 | Cho | F16H 59/0208 74/473.29 |
| 2014/0345409 A1* | 11/2014 | Watanabe | F16H 59/08 74/473.3 |
| 2019/0063592 A1* | 2/2019 | Colom | F16H 59/0208 |
| 2021/0054924 A1* | 2/2021 | Kim | F16H 59/12 |

FOREIGN PATENT DOCUMENTS

| | | | | |
|---|---|---|---|---|
| JP | 2008152965 A | * | 7/2008 | |
| KR | 101460364 B1 | * | 11/2014 | ........... H01H 13/14 |
| KR | 20190134927 A | | 12/2019 | |
| WO | WO-2020152608 A2 | * | 7/2020 | .......... F16D 43/202 |

* cited by examiner

*Primary Examiner* — T. Scott Fix
(74) *Attorney, Agent, or Firm* — MORGAN, LEWIS & BOCKIUS LLP

(57) ABSTRACT

A dial-type shifting control apparatus of vehicles may include a dial bezel and an upper cover integrated into a single body to be rotated together when a dial is rotated, obviating formation of an operation gap between the dial bezel and the upper cover to prevent foreign substances from entering through the operation gap, and a button guide disposed under an upper cover attenuates an impact occurring when a P-gear button is returned, and thus to prevent noise, caused by striking of the upper cover when the P-gear button is returned, from being transmitted to the interior of a vehicle.

6 Claims, 8 Drawing Sheets

DIAL-TYPE SHIFTING CONTROL APPARATUS FOR VEHICLES

CROSS-REFERENCE TO RELATED APPLICATION

The present application claims priority to Korean Patent Application No. 10-2020-0108932 filed on Aug. 28, 2020, the entire contents of which is incorporated herein for all purposes by this reference.

BACKGROUND OF THE INVENTION

Field of the Invention

The present invention relates to a dial-type shifting control apparatus for vehicles. More particularly, it relates to a dial-type shifting control apparatus of vehicles which has an improved structure configured for preventing foreign substances from entering therein.

Description of Related Art

Recently, a shift-by-wire system, by which transmission modes are changed in a vehicle through electronic control rather than mechanical control, has been applied as a shift system for vehicles.

To perform shifting in the shift-by-wire system and to reduce a packaging space of parts of a shifting lever, a dial-type shifting control apparatus is mounted in a space between a center fascia panel and a console.

The dial-type shifting control apparatus essentially includes a P-gear button for operating a P gear, and a dial rotatably mounted on the circumference of the P-gear button for shifting to R, N and D gears.

Here, the configuration of a conventional dial-type shifting control apparatus will be described with reference to FIG. 1, FIG. 2, and FIG. 3.

As shown in FIG. 1, a P-gear button 210 configured to operate the P gear is disposed at the central position of the conventional dial-type shifting control apparatus as seen from the interior of a vehicle to be configured for being pressed, an upper cover 220 is fixedly disposed on the circumference of the P-gear button 210, and a dial bezel 230 and a dial 240 configured to perform shifting to the R, N and D gears are concentrically disposed on the circumference of the upper cover 220 to be simultaneously rotatable.

The P-gear button 210 is characterized in that it is pressed when pressing force is applied thereto and is returned to an original position thereof when the pressing force is released in the same manner as the pad of a keyboard, and includes, as shown in FIG. 2 and FIG. 3, a body 212 imprinted with a character P indicating the parking gear, guide blocks 214 configured to protrude from the body 212 in four directions, and stoppers 216 attached to the guide blocks 214.

Substantially, the P-gear button 210 is disposed at the center portion of the upper surface of a button guide 250 to be configured for being pressed.

For the present purpose, guide grooves 252, into which the guide blocks 214 of the P-gear button 210 are inserted to be raised and lowered, are formed in the upper portion of the button guide 250.

The button guide 250 is fastened to a button housing 260 such that movement of the button guide 250 in the lateral direction is configured for being prevented.

For the present purpose, as shown in FIG. 3, fastening pins 254 are formed on the external circumferential portion of the button guide 250, and fastening grooves 264, into which the fastening pins 254 are inserted, are formed in the internal circumferential portion of the button housing 260.

Here, the upper cover 220 is fixed to the button housing 260 while pressing the button guide 250 to prevent vertical movement of the button guide 250, being fastened to the button housing 260.

For the present purpose, as shown in FIG. 3, first hooks 222 are formed on the external circumferential portion of the upper cover 220, and first locking holes 262, into which the first hooks 222 are fastened, are formed in the upper end portion of the button housing 260.

The dial bezel 230 and the dial 240 are fastened to each other to be rotated together.

For the present purpose, as shown in FIG. 2, second locking holes 232 are formed in the lower portion of the dial bezel 230, and second hooks 242, which are fastened into the second locking holes 232, are formed on the internal surface of the dial 240.

An operation gap G is formed between the dial bezel 230 and the upper cover 220 so that the dial bezel 230 is easily rotated without interfering with the upper cover 220 when a user rotates the dial 240 and thus the dial bezel 230 is rotated with rotation of the dial 240, as shown in FIG. 1.

Furthermore, an oblique plane 224 is formed on the external circumferential portion of the upper surface of the upper cover 220 to avoid contact with the dial bezel 230, as shown in FIG. 2, and thereby, the operation gap G may be easily formed between the dial bezel 230 and the upper cover 220.

Furthermore, a dial housing 244, in which the button housing 260 is received, extends from the lower portion of the dial 240, as shown in FIG. 2, and the dial housing 244 is not visible from the interior of the vehicle and is covered with a main housing 270, as shown in FIG. 1.

Therefore, when a user presses the P-gear button 210 to operate the P gear, an electrical signal for selecting the P gear is transmitted to a transmission controller and thus a process of shifting to the P gear may be performed.

Furthermore, when the user rotates the dial 240 to the position of one of the R, N and D gears, the dial bezel 230 is rotated with rotation of the dial 240, an electrical signal for selecting the one of the R, N and D gears is transmitted to the transmission controller and thus a process of shifting to the selected one of the R, N and D gears may be performed.

However, the above-described conventional dial-type shifting control apparatus has the following problems.

First, due to the operation gap G formed between the dial bezel 230 and the upper cover 220, the dial 240 and the dial bezel 230 may be easily rotated, but if foreign substances enter the dial-type shifting control apparatus through the operation gap G or are caught in the operation gap G, the dial 240 or the dial bezel 230 is not smoothly rotated.

Second, when the user presses the P-gear button 210 and then releases pressing force from it, the P-gear button 210 is raised and returned to the original position thereof in the same manner as keys of a keyboard, and in the instant case, the stoppers 216 attached to the guide blocks 214 of the P-gear button 210 strike the upper cover 220, and the sound of an impact on the upper cover 200 is directly transmitted to the internal and thus causing noise.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a dial-type shifting control apparatus for vehicles in which a dial bezel and an upper cover are integrated into a single body to be rotated together when a dial is rotated, and may thus obviate formation of an operation gap between the dial bezel and the upper cover to prevent foreign substances from entering through the operation gap and to enable the dial to be smoothly rotated.

Various aspects of the present invention are directed to providing a dial-type shifting control apparatus for vehicles in which a button guide disposed under an upper cover attenuates an impact occurring when a P-gear button is returned, and may thus prevent noise, caused by striking of the upper cover when the P-gear button is returned, from being transmitted to the interior of a vehicle.

Various aspects of the present invention are directed to providing a dial-type shifting control apparatus for vehicles, including an upper cover configured to have a P-gear button exposure hole formed therethrough, a dial bezel integrated with the upper cover into a single body along a circumference of the upper cover, a dial disposed on a circumference of the dial bezel and fastened to the dial bezel to be rotated simultaneously with the dial bezel, a dial housing configured to extend integrally from a lower portion of the dial and mounted on a rotation shaft of a main housing, a button housing disposed in the dial housing and fixedly mounted on a stationary shaft of the main housing, a button guide fixedly fastened into the button housing to guide an elevation direction of a P-gear button, and the P-gear button disposed on the button guide such that an impact generated when the P-gear button is returned to an original position thereof may be absorbed, and exposed outside through the P-gear button exposure hole of the upper cover.

In various exemplary embodiments of the present invention, the upper cover and the dial bezel may be formed to be integrated into the single body by a dual injection molding.

In another exemplary embodiment of the present invention, first locking holes may be formed in a lower portion of the dial bezel, and first hooks configured to be fastened into the first locking holes may be formed on an internal surface of the dial.

In yet another exemplary embodiment of the present invention, second locking holes may be formed through a bottom surface of the dial housing, and second hooks configured to be fastened into the second locking holes may be formed on an upper portion of the rotation shaft.

In yet another exemplary embodiment of the present invention, the button guide may include an external ring fastened to the button housing, an internal ring configured such that a body of the P-gear button is located therein to be elevated, a connector configured to connect the external ring to the internal ring, guide holes formed in the connector such that guide blocks of the P-gear button are located in the guide holes to be elevated, and an impact absorption member formed on an upper end portion of the internal ring to absorb an impact caused by return of stoppers attached to the guide blocks of the P-gear button.

In still yet another exemplary embodiment of the present invention, third locking holes may be formed in an internal surface of the button housing, and third hooks configured to be fastened to the third locking holes may be formed on an external surface of the button guide.

Other aspects and exemplary embodiments of the present invention are discussed infra.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
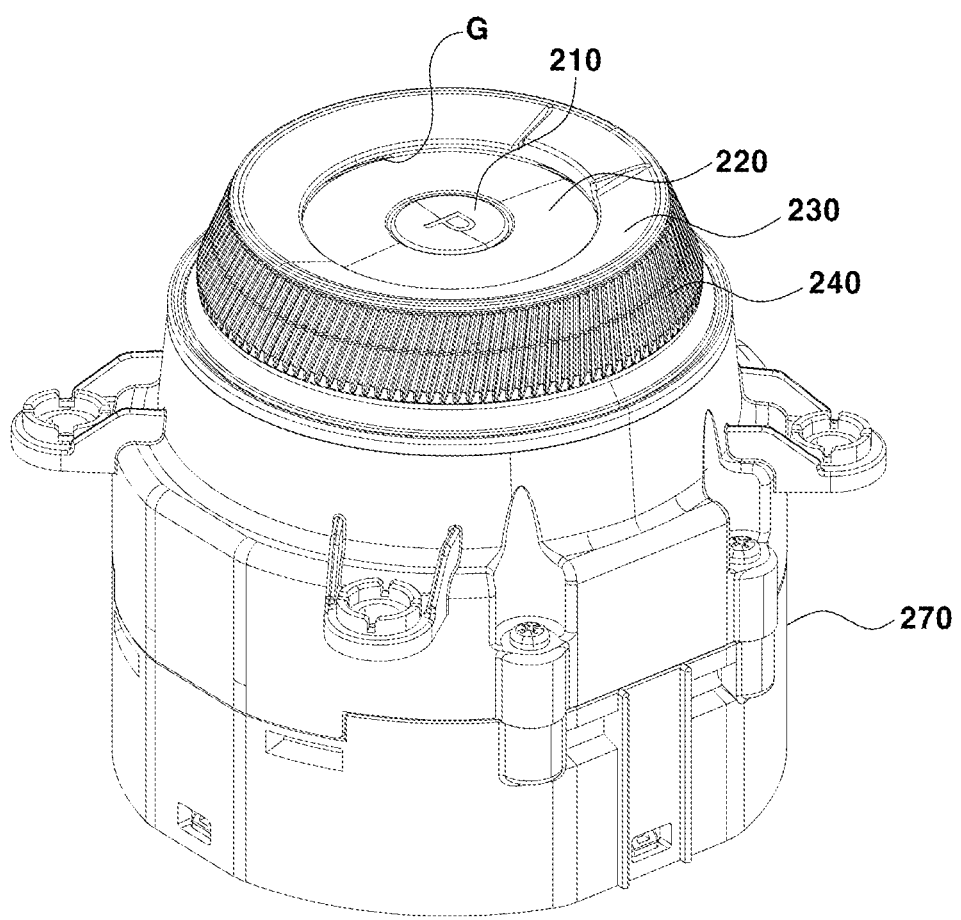
FIG. 1 is a perspective view exemplarily illustrating the external appearance of a conventional dial-type shifting control apparatus.
Figure 2:
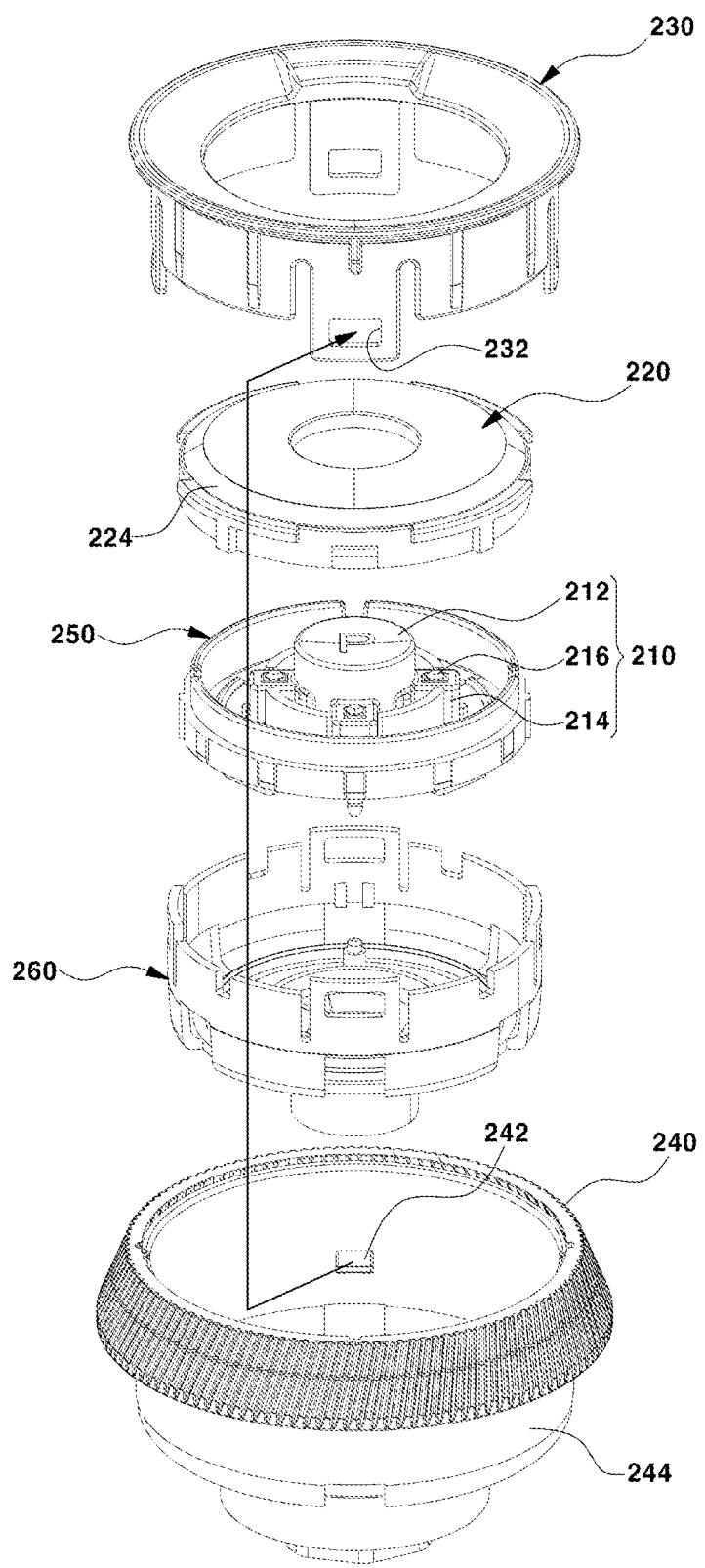
FIG. 2 and FIG. 3 are exploded perspective views exemplarily illustrating the conventional dial-type shifting control apparatus.
Figure 3:
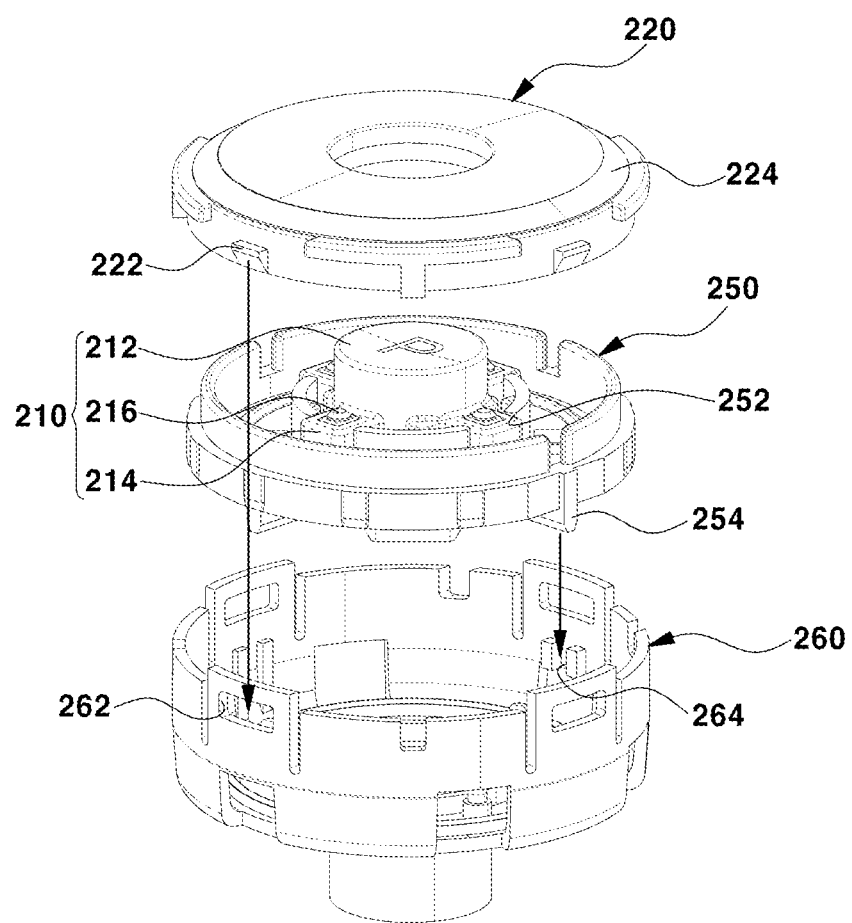

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 4:
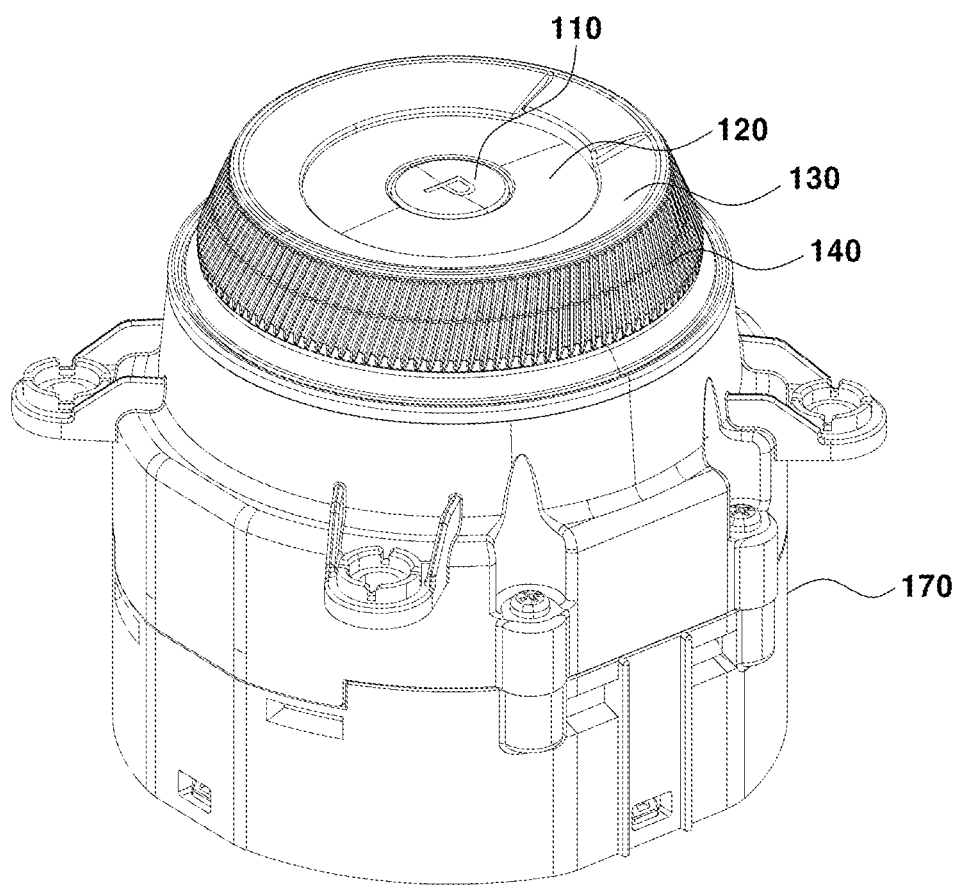
FIG. 4 is a perspective view exemplarily illustrating the external appearance of a dial-type shifting control apparatus according to various exemplary embodiments of the present invention.
Figure 5:
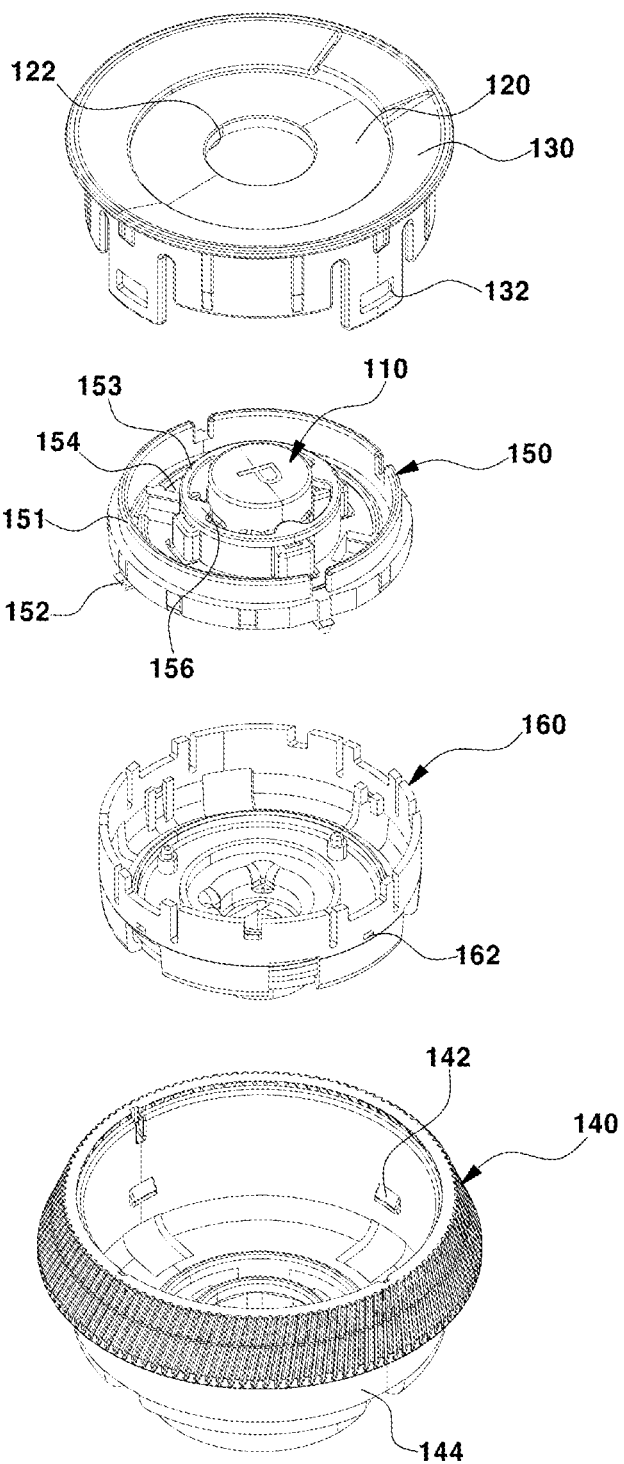
FIG. 5 is an exploded perspective view exemplarily illustrating the dial-type shifting control apparatus according to various exemplary embodiments of the present invention.

FIG. 4 is a perspective view exemplarily illustrating the external appearance of a dial-type shifting control apparatus according to various exemplary embodiments of the present invention, and FIG. 5 is an exploded perspective view exemplarily illustrating the dial-type shifting control apparatus according to various exemplary embodiments of the present invention.

As shown in FIG. 4 and FIG. 5, a P-gear button 110 configured to operate the P gear is disposed at the central position of the dial-type shifting control apparatus according to various exemplary embodiments of the present invention, as seen from the interior of a vehicle, to be configured for being pressed, an upper cover 120 and a dial bezel 130, which are integrated into a single body, are rotatably disposed on the circumference of the P-gear button 110, and a dial 140 is disposed on the circumference of the dial bezel 130 to be rotated simultaneously with rotation of the dial bezel 130.

Since the upper cover 120 and the dial bezel 130 are integrated into a single body, no gap is formed between the upper cover 120 and the dial bezel 130 unlike the conventional dial-type shifting control apparatus, preventing foreign substances from entering the dial-type shifting control apparatus according to various exemplary embodiments of the present invention.

The upper cover 120 and the dial bezel 130 may be formed of different materials, and thus, the upper cover 120 and the dial bezel 130 may be formed into one body by a conventional double shot injection molding.

When the upper cover 120 is formed by the conventional double shot injection molding, a P-gear button exposure hole 122 is formed through the center portion of the upper cover 120 to expose the P-gear button 110 therethrough.

The dial bezel 130 and the dial 140 are fastened to each other so that the upper cover 120 and the dial bezel 130 may be rotated simultaneously with the dial 140.

For the present purpose, first locking holes 132 are formed in the lower portion of the dial bezel 130, and first hooks 142, which are fastened into the first locking holes 132, are formed on the internal surface of the dial 140.

Because the upper cover 120 and the dial bezel 130 are integrated into a single body and the dial 140 is fastened to the dial bezel 130, when a user rotates the dial 140 to perform shifting to the R, N or D gear, the upper cover 120 and the dial bezel 130 may be rotated with the dial 140.

Figure 8:
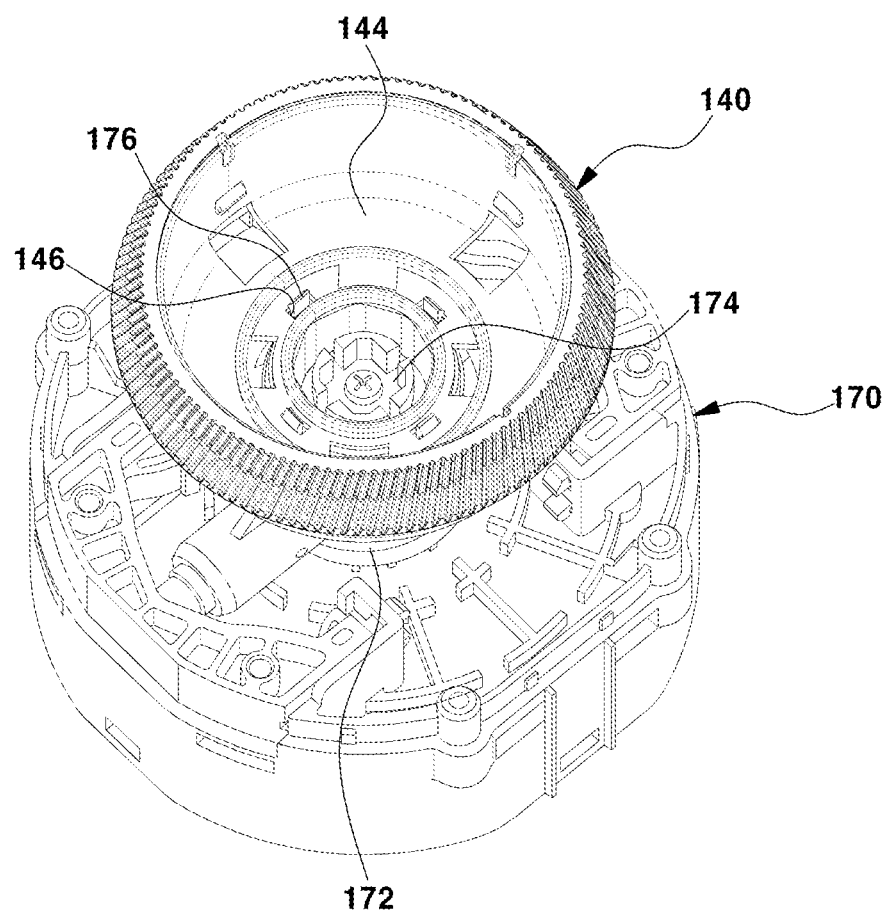
FIG. 8 is a perspective view exemplarily illustrating rotatable mounting of a dial housing, integrated with a dial into a single body, on the main housing in the dial-type shifting control apparatus according to various exemplary embodiments of the present invention.

A dial housing 144, in which a button housing 160 is received, extends integrally from the lower portion of the dial 140, and the dial housing 144 is rotatably fastened to a rotation shaft 172 of a main housing 170, as shown in FIG. 8.

For the present purpose, second locking holes 146 are formed through the bottom surface of the dial housing 144, and second hooks 176, which are fastened into the second locking holes 146, are formed on the upper portion of the rotation shaft 172.

Since the button housing 160 is received in the dial housing 144, the button housing 160 is fixedly mounted on a stationary shaft 174 of the main housing 170 by a screw, as shown in FIG. 8.

Furthermore, a button guide 150 configured to guide the elevation direction of the P-gear button 110 is fixedly mounted in the button housing 160.

Moreover, the P-gear button 110 is disposed in the button housing 160 such that an impact caused by returning of the P-gear button 110 may be absorbed, and the P-gear button 110 is thus externally exposed through the P-gear button exposure hole 122 formed through the upper cover 120 to be configured for being pressed.

Figure 6:
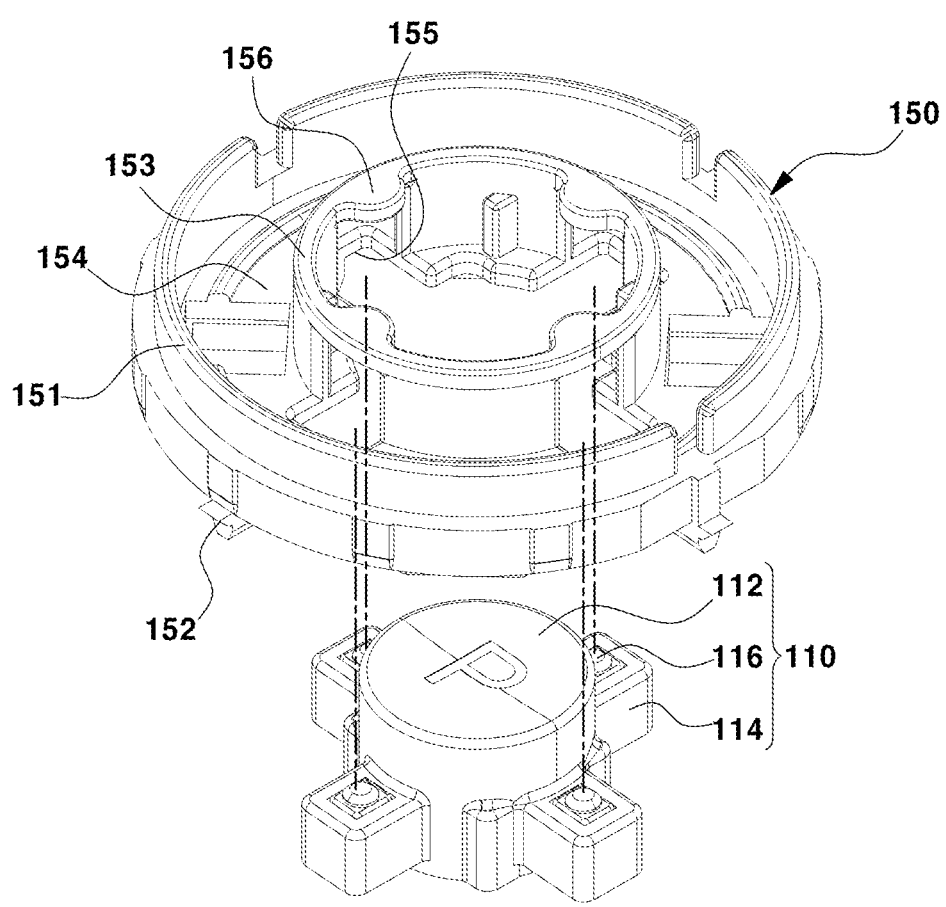
FIG. 6 is an exploded perspective view exemplarily illustrating a P-gear button and a button guide in the dial-type shifting control apparatus according to various exemplary embodiments of the present invention.
Figure 7:
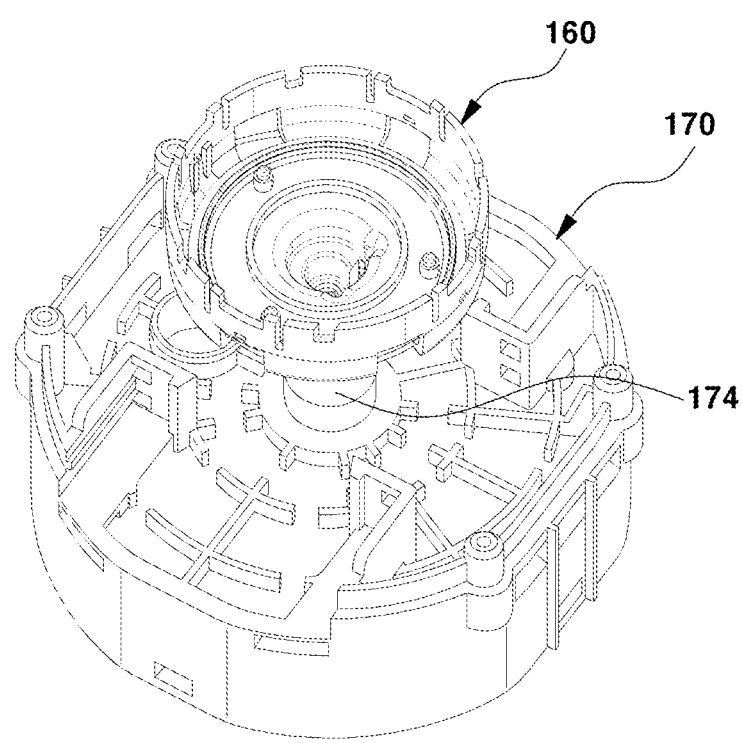
FIG. 7 is a perspective view exemplarily illustrating fixedly mounting of a button housing to a main housing in the dial-type shifting control apparatus according to various exemplary embodiments of the present invention.

Referring to FIGS. 5 and 6, the P-gear button 110 is characterized in that it is pressed when pressing force is applied thereto and is returned to an original position thereof when the pressing force is released in the same manner as keys of a keyboard, and includes a body 112 imprinted with a character P indicating the parking gear, guide blocks 114 configured to protrude from the body 112 in four directions, and stoppers 116 attached to the guide blocks 114.

The button guide 150 may include, as shown in FIG. 5 and FIG. 6, an external ring 151 which is fastened to the button housing 160, an internal ring 153 in which the body 112 of the P-gear button 110 is located to be elevated, a connector 154 which connects the external ring 151 to the internal ring 153, guide holes 155 which are formed in the connector 154 such that the guide blocks 114 of the P-gear button 110 are located in the guide holes 155 to be elevated, and an impact absorption member 156 which is formed on the upper end portion of the internal ring 153 to absorb an impact caused by the return of the stoppers 116 attached to the guide blocks 114.

Furthermore, third locking holes 162 are formed in the internal surface of the button housing 160, and third hooks 152, which are fastened into the third locking holes 162, are formed on the external surface of the external ring 151 of the button guide 150, to fasten the button guide 150 to the button housing 160 therethrough.

The assembly process and the structure of the dial-type shifting control apparatus having the above configuration according to various exemplary embodiments of the present invention will be described below.

First, the dial housing 144 formed at the lower portion of the dial 140 is rotatably fastened to the rotation shaft 172 of the main housing 170 by fastening the second hooks 176 formed at the upper portion of the rotation shaft 172 of the main housing 170 into the second locking holes 146 formed through the bottom surface of the dial housing 144.

Thereafter, the button housing 160 is received in the dial housing 144 by fixedly mounting the button housing 160 on the stationary shaft 174 of the main housing 170 using the screw.

Subsequently, the stoppers 116 of the P-gear button 110 are located under the impact absorption member 156 of the button guide 150 by disposing the body 112 of the P-gear button 110 in the internal ring 153 of the button guide 150 and disposing the guide blocks 114 of the P-gear button 110 in the guide holes 155 of the button guide 150, simultaneously.

Thereafter, the button guide 150 is fixedly received in the button housing 160 by fastening the third hooks 152 of the external ring 151 of the button guide 150 into the third locking holes 162 formed in the button housing 160.

Thereafter, the dial bezel 130 integrated with the upper cover 120 into a single body, and the dial 140 having the dial housing 144 may be coupled to each other by inserting the lower end portion of the dial bezel 130 integrated with the upper cover 120 between the button housing 140 and the dial 140 and then fastening the first hooks 142 formed on the dial 140 into the first locking holes 132 formed in the lower portion of the dial bezel 130.

Here, the body 112 imprinted with the character P indicating the parking gear of the P-gear button 110 is externally exposed through the P-gear button exposure hole 122 of the upper cover 120 so that the body 112 is configured for being pressed, and thereby, assembly of the dial-type shifting control apparatus according to various exemplary embodiments of the present invention has been completed.

In the above completely assembled state, the upper cover 120 and the dial bezel 130 are integrated into a single body, and thus no gap is formed between the upper cover 120 and the dial bezel 130 unlike the conventional dial-type shifting control apparatus, being configured for preventing foreign substances from entering the dial-type shifting control apparatus according to various exemplary embodiments of the present invention.

Therefore, when a user presses the P-gear button 110 to operate the P gear, an electrical signal for selecting the P gear is transmitted to a transmission controller and thus a process of shifting to the P gear may be performed.

Furthermore, when the user rotates the dial 140 to the position of one of the R, N and D gears, the dial bezel 130 and the upper cover 120 are rotated with rotation of the dial 140, an electrical signal for selecting the one of the R, N and D gears is transmitted to the transmission controller and thus a process of shifting to the selected one of the R, N and D gears may be performed.

When the user presses the P-gear button 110 and then releases pressing force therefrom, the P-gear button 110 is raised and returned to the original position thereof in the same manner as keys of a keyboard, and in the instant case, the stoppers 116 attached to the guide blocks 114 of the P-gear button 110 contact with the impact absorption member 156 of the button guide 150 received in the upper cover 120 and thus the impact absorption member 156 absorbs the sound of an impact on the upper cover 120, preventing generation of noise caused by direct transmission of the impact sound to the interior of a vehicle.

That is, the impact absorption member 156 of the button guide 150 disposed under the upper cover 120 may absorb an impact generated when the P-gear button 110 is returned to the original position thereof, preventing transmission of noise generated when the conventional P-gear button is returned to the original position thereof and then strikes the upper cover, thus improving consumer emotional quality through reduction in internal noise.

As is apparent from the above description, a dial-type shifting control apparatus for vehicles according to various exemplary embodiments of the present invention are directed to providing the following effects.

First, a dial bezel and an upper cover are integrated into a single body to be rotated together when a dial is rotated, and may thus obviate formation of an operation gap between the dial bezel and the upper cover, preventing foreign substances from entering through the operation gap and facilitating the dial to be smoothly rotated to perform shifting.

Second, a button guide disposed under the upper cover attenuates an impact occurring when a P-gear button is returned to an original position thereof, and may thus prevent noise, caused by striking of the upper cover when the conventional P-gear button is returned the original position thereof, from being transmitted to the interior of a vehicle, improving consumer emotional quality through reduction in internal noise.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A shifting control apparatus of vehicles, the shifting control apparatus comprising:
    an upper cover having a button exposure hole formed through the upper cover;
    a dial bezel extending in a circumferential direction of the upper cover and integrated with the upper cover to form a single solid body without a gap between the dial bezel and the upper cover along a circumference of the upper cover, wherein the upper cover and the dial bezel are integrated into the single solid body by a dual shot injection molding;
    a dial disposed on a circumference of the dial bezel and fastened to the dial bezel to be rotated simultaneously with the dial bezel;
    a dial housing extending from and integrated with a lower portion of the dial and mounted on a rotation shaft of a main housing;
    a button housing disposed in the dial housing and fixedly mounted on a stationary shaft of the main housing; and
    a button guide fixedly fastened into the button housing to guide a button in an elevation direction thereof,
    wherein the button is disposed on the button guide so that an impact generated when the button is returned to an original position thereof is absorbed, and the button is exposed outside of the upper cover through the button exposure hole of the upper cover, and
    wherein the button guide comprises:
        an external ring fastened to the button housing;
        an internal ring formed inside the external ring so that a body of the button is elevated in the internal ring;
        guide holes, wherein guide blocks of the button located in the guide holes are selectively elevated along the guide holes; and
        an impact absorption member formed on an upper end portion of an internal ring in an axial direction of the guide holes to absorb the impact caused by return of the guide blocks of the button.

2. The shifting control apparatus of claim 1, wherein first locking holes are formed in a lower portion of the dial bezel, and first hooks configured to be fastened into the first locking holes are formed on an internal surface of the dial.

3. The shifting control apparatus of claim 1, wherein second locking holes are formed through a bottom surface of the dial housing, and second hooks configured to be fastened into the second locking holes are formed on an upper portion of the rotation shaft.

4. The shifting control apparatus of claim 1, further including:
    stoppers attached to an upper portion of the guide blocks of the button, wherein the impact absorption member absorbs the impact caused by return of the stoppers.

5. The shifting control apparatus of claim 1,
    wherein the internal ring is offset from the external ring inwards with a predetermined length so that the body of the button is located in the internal ring to be elevated, wherein the button guide further includes a connector connecting the external ring to the internal ring, and wherein the guide holes are formed in the connector.

6. The shifting control apparatus of claim 1, wherein third locking holes are formed in an internal surface of the button housing, and third hooks configured to be fastened to the third locking holes are formed on an external surface of the button guide.

\* \* \* \* \*